(12) United States Patent
Shimomura (10) Patent No.: US 7,607,198 B2
(45) Date of Patent: Oct. 27, 2009

(54) HINGE MECHANISM FOR AIR CLEANER

(75) Inventor: Chikara Shimomura, Hamamatsu (JP)

(73) Assignee: Toyo Roki Seizo Kabushiki Kaisha, Hamamatsu-shi, Shizuoka (JP)

( * ) Notice: Subject to any disclaimer, the term of this patent is extended or adjusted under 35 U.S.C. 154(b) by 690 days.

(21) Appl. No.: 11/236,251

(22) Filed: Sep. 27, 2005

(65) Prior Publication Data

US 2006/0064955 A1 Mar. 30, 2006

(30) Foreign Application Priority Data

Sep. 30, 2004 (JP) .............................. P2004-288167

(51) Int. Cl.
*E05D 1/00* (2006.01)
(52) U.S. Cl. .............................. 16/225; 16/224; 16/268; 16/271
(58) Field of Classification Search ................... 16/225, 16/226, 271, 272, 383–385, 224, 268; 220/810, 220/812, 836, 837, 845, 840–843, 847; 24/563, 24/338, 457, 467, 479, 482, 489, 490; 123/184.52, 123/184.53, 198 E; 55/490, 493, 497, 385.1, 55/385.2; 267/158, 160, 165
See application file for complete search history.

(56) References Cited

U.S. PATENT DOCUMENTS

| | | | | |
|---|---|---|---|---|
| 2,231,153 A * | 2/1941 | Camiener | ...................... | 248/73 |
| 3,204,288 A * | 9/1965 | Adams | .......................... | 16/268 |
| 3,351,206 A * | 11/1967 | Wennerstrom | ............... | 210/474 |
| 3,389,438 A * | 6/1968 | Haynes | .......................... | 24/561 |
| 3,921,253 A * | 11/1975 | Nelson | .......................... | 16/257 |
| 4,064,603 A * | 12/1977 | Romanzi, Jr. | ................. | 24/650 |
| 4,296,524 A * | 10/1981 | Horholt et al. | ................. | 16/225 |
| 4,307,976 A * | 12/1981 | Butler | ......................... | 405/118 |
| 4,437,529 A * | 3/1984 | Fralish | ....................... | 180/69.2 |
| 4,750,300 A * | 6/1988 | Winger, Jr. | ...................... | 52/12 |
| 4,805,885 A * | 2/1989 | Gingerich et al. | ........... | 267/165 |
| 5,513,909 A * | 5/1996 | Teich | ....................... | 312/351.6 |
| 5,569,311 A * | 10/1996 | Oda et al. | ...................... | 55/493 |
| 5,641,086 A * | 6/1997 | Sonntag et al. | .............. | 220/845 |
| 6,049,963 A * | 4/2000 | Boe | ......................... | 29/525.01 |

FOREIGN PATENT DOCUMENTS

JP 7-247923 9/1995
JP 2000-145550 5/2000

* cited by examiner

*Primary Examiner*—Chuck Y. Mah
(74) *Attorney, Agent, or Firm*—Ladas & Parry LLP (57) ABSTRACT

A hinge mechanism which makes detachably engage a casing with a cover including:
 an insertion portion formed in the casing or cover and protrudes outward from an outer face of the one; and
 a holding portion extending from the other one which has an insertion hole, wherein
 a clip for applying a pressing force is engaged with the holding portion or the insertion portion, and includes an engagement part engaged with a tip end of the insertion hole or with an outer peripheral face of the insertion portion, and a spring part,
 the spring part includes a bending part bent in one axial direction, and -opposing parts on both sides thereof, and generates the pressing force to open the opposing parts, and
 the insertion portion is pressed against the bottom of the holding portion with the pressing force.

9 Claims, 9 Drawing Sheets

HINGE MECHANISM FOR AIR CLEANER

BACKGROUND OF THE INVENTION

1. Field of the Invention

The present invention relates to a hinge mechanism for air cleaner used in vehicles.

2. Description of the Related Art

In a conventional technique, there is provided an air cleaner for vehicles has a hinge which enables a casing and a cover, both of which constitutes a housing, to be detachable on one sides thereof so that the cover can be freely opened or closed against the casing.

For example, Japanese Unexamined Patent Publication No. 7-247923, which is hereby incorporated by reference, discloses an air cleaner comprising a first housing and a second housing, in which a seal member is attached to a joint face of the first housing and the second housing, and a filter element is contained in the first housing. In the air cleaner, a hinge has a first engagement part provided at the first housing and a second engagement part which is engaged with the first engagement part and provided at the second housing, the engagement parts being formed on one sides of the first and second housing.

In this hinge, a first guide part and a second guide part are formed in the vicinity of the first engagement part and the second engagement part respectively of the first housing and the second housing. A third guide part and a fourth guide part are formed interposing a space respectively from the first engagement part and the second engagement part in a direction parallel to the direction of the above-mentioned engaging movement of the second housing. These four guide parts are shaped so that engaging movement of the second housing is guided while preventing the edge of a sealed face from interfering with a seal member during engaging movement to thereby elastically deform the seal member in a seal-impairment condition and so that the seal member can be adhered to the sealed face in a state where the first engaging part is engaged with the second engaging part.

However, since the air cleaner is subjected to vibration at all times and repeatedly opened or closed, each engaging part in the above-mentioned conventional hinge becomes worn. For this reason, there is a disadvantage that an interference of the seal member is decreased, and sealing performance is deteriorated.

To solve the disadvantage, in Japanese Unexamined Patent Publication No. 2000-145550, which is hereby incorporated by reference, there is provided an air cleaner including a hinge shaft formed at one of a pair of cases, which is engaged with a claw formed at the other of the pair of cases, so that the pair of cases are combined to be freely openable/closable and a device for pressing the claw against the hinge shaft in the direction of fastening a packing.

The present invention is provided to further improve anti-vibration performance and workability in assembly with respect to the invention disclosed in Japanese Unexamined Patent Publication No. 2000-145550.

SUMMARY OF THE INVENTION

According to an aspect of the present invention, to solve the above-mentioned problem, there is provided a hinge mechanism which makes detachably engage a casing (3) with a cover (5) in an air cleaner (1) comprising: an insertion portion (21, 51) which is formed in one of the casing (3) and the cover (5) and protrudes outward from an outer face of the one of the casing and the cover; and a holding portion (11, 61) which extends from the other one of the casing and the cover and has an insertion hole (12, 62) to receive the insertion portion (21, 51) thereinto, wherein a clip (30, 40, 70), which is made from an elastic member to apply a pressing force of pressing the casing (3) and the cover (5) in the direction of making these approach each other, is engaged with one of the holding portion (11, 61) and the insertion portion (21, 51), the clip (30, 40, 70) includes an engagement part (30B, 40B, 70B) which is engaged with a tip end (13, 13a) located through and over the insertion hole (12, 62) of the holding portion (11, 61) or with an outer peripheral face of the insertion portion (21, 51), and a spring part (30A, 40A, 70A) which is formed integrally with the engagement part (30B, 40B, 70B) to apply the pressing force, the spring part (30A, 40A, 70A) includes a bending part (31, 41, 71) which is formed by bending the plate-like elastic member in one axial direction, and opposing parts (35, 36, 42, 46, 72, 73) which are positioned on both sides of the bending part (31, 41, 71), the spring part (30A, 40A, 70A) generates the pressing force so that the opposing parts (35, 36, 42, 46, 72, 73), located on the both sides of the bending part (31, 41, 71) are opened with respect to a base point being, the bending part (31, 41, 71), and the insertion portion (21, 51), which is inserted into the insertion hole (12, 62) is pressed against the bottom of the holding portion (11, 61) with the pressing force is adopted.

According to another aspect of the present invention, there is provided a hinge mechanism for air cleaner according to the preceding aspect, wherein bending parts (31, 32) are formed at two positions of the clip (30) in the one axial direction so that the elastic member is bent in directions opposite to each other, the spring part (30A) includes a first bending part (31), being one of the two bending parts, and opposing flat plates (35, 36) located on both sides of the first bending part (31), the engagement part (30B) includes a second bending part (32), being the other of the two bending parts, and opposing flat plates (36, 37), located on both sides of the second bending part (32), the engagement part (30B) of the clip (30) is engaged with the tip end of the holding portion (11) so that the spring part (30A) is located inside the insertion hole (12), and the insertion portion (21) is inserted between a bottom of the holding portion (11) in the insertion hole (12) and the spring part (30A).

According to another aspect of the present invention, there is provided a hinge mechanism for air cleaner according to the preceding aspect, wherein an engagement hole (33, 34) is formed respectively on both of the second bending part (32) which forms the engagement part (30B), and the flat plate (37), which is located on a side opposite to the spring part (30A), the tip end (13) of the holding portion (11) has engagement claws (14, 15) on a side surface where the second bending part (32) of the engagement part (30B) is mated to the tip end and a tip end side where the flat plate (37) located on a side opposite to the spring part (30A) is mated to the tip end, and the engagement claws (14, 15) are inserted into the engagement holes (33, 34) so as to place the clip (30) at the tip end (13).

According to another aspect of the present invention, there is provided a hinge mechanism for air cleaner according to the preceding aspect, wherein the tip end (39) of the flat plate (37) located on the side opposite to the spring part (30A) of the engagement part (30B) are outward deflected.

According to another aspect of the present invention, there is provided a hinge mechanism for air cleaner according to the preceding aspect, wherein in one portion of the clip (40) on one side of the bending part (41) is separated into an inside part (44) and an outer peripheral part (46) while maintaining their connection at the bending part (41), the inside part (44)

and the outer peripheral part are bent at the bending part (41) in an identical direction such that the inside part is located on an inner side of the outer peripheral part (46), the engagement part (40B) includes a portion (42) other than the one portion of the clip on the other side of the bending part (41) and the inside part (44), the spring part (40A) includes the other portion (42) and the outer peripheral part (46), and the engagement part (40B) is engaged with an outer face of the insertion portion (21) in a state where the outer peripheral part (46) is directed to a side of the tip end (13) of the holding portion (11).

According to another aspect of the present invention, there is provided a hinge mechanism for air cleaner according to the preceding aspect, wherein the tip end (45) of the inside part (44) forming the engagement part (40B) and a tip end (43) of the other portion (42) are respectively shaped to outward deflect.

According to another aspect of the present invention, there is provided a hinge mechanism for air cleaner according to the preceding aspect, wherein a tip end (46) of the outer peripheral part forming the spring part has a stopper (47) which is outward deflected to be in contact with the holding portion (11).

According to another aspect of the present invention, there is provided a hinge mechanism for air cleaner according to the preceding aspect, wherein one portion of the clip (70) on one side of the bending part (71) is separated into an inside part (73) and an outer peripheral part (75) by a slit, a turning part which bends the outer peripheral part (75) in a direction same as a direction of bending the bending part so as to position the outer peripheral part (75) on a side outward the inside part (73) with respect to the bending part (71), is formed in the outer peripheral part (75), the engagement part (70B) includes the inside part (73) and the outer peripheral part (75), the spring part (70A) includes the other portion and the inside part (73), both bounded by the bending part, and the clip (70) makes the engagement part (70B) engage with tip end (63) so that the other portion (72) is directed to the bottom of the holding portion (61).

According to another aspect of the present invention, there is provided a hinge mechanism for air cleaner according to the preceding aspect, wherein the bending part (71) of the clip (70) is engaged with the tip end (63) so as to be opposite to the cover (5) or the casing (3) having the insertion portion (51) formed therein.

According to another aspect of the present invention, there is provided a hinge mechanism for air cleaner according to the preceding aspect, wherein one of the engagement claw (66, 78) and the engagement part (64, 74), engaged with the tip end (63) for fixing the position of the clip (70) is formed in the outer peripheral part (75) or the inside part (73), and the engagement part (64, 74) or the engagement claw (66, 78), engaged with the engagement claw (66, 78) or the engagement part (64, 74), is formed on a face where the outer peripheral part (75) is mated to the tip end (63) and a face where the inside part (73) is mated to the tip end, respectively.

According to another aspect of the present invention, there is provided a hinge mechanism for air cleaner according to the preceding aspect, wherein an engagement protrusion (65) is formed so as to be inserted into a space which is formed inside the outer peripheral part (75) in the tip end (63).

According to another aspect of the present invention, there is provided a hinge mechanism for air cleaner according to the preceding aspect, wherein the tip end (77) of the outer peripheral part (75) and the tip end (73a) of the inside part (73) are deflected in directions opposite to each other and the tip end (72a) of the other portion (72) bordered by the bending part (71), is deflected toward the tip end (63).

According to the present invention, clip prevents displacement between the holding portion and the insertion portion, functions as a buffer member and effectively prevents wear of the hinge part due to oscillation and the like. Moreover, since the clip can be fitted to the holding portion or the insertion portion through one-touch operation and the casing and the cover of the air cleaner can be engaged with each other merely by inserting the insertion portion into the insertion hole formed at the holding portion, assembly can be very easily.

Furthermore, the hinge mechanism allows the insertion portion to be inserted into the insertion hole of the holding portion to thereby engage the cover with the case, the cover can be attached to the casing by sliding the cover with respect to the case. For this reason, even when a space for attachment of the air cleaner is insufficient, the cover can be easily attached to the casing.

DESCRIPTION OF THE PREFERRED EMBODIMENT

An embodiment of the present invention will be described below with reference to Figures.

Figure 1:
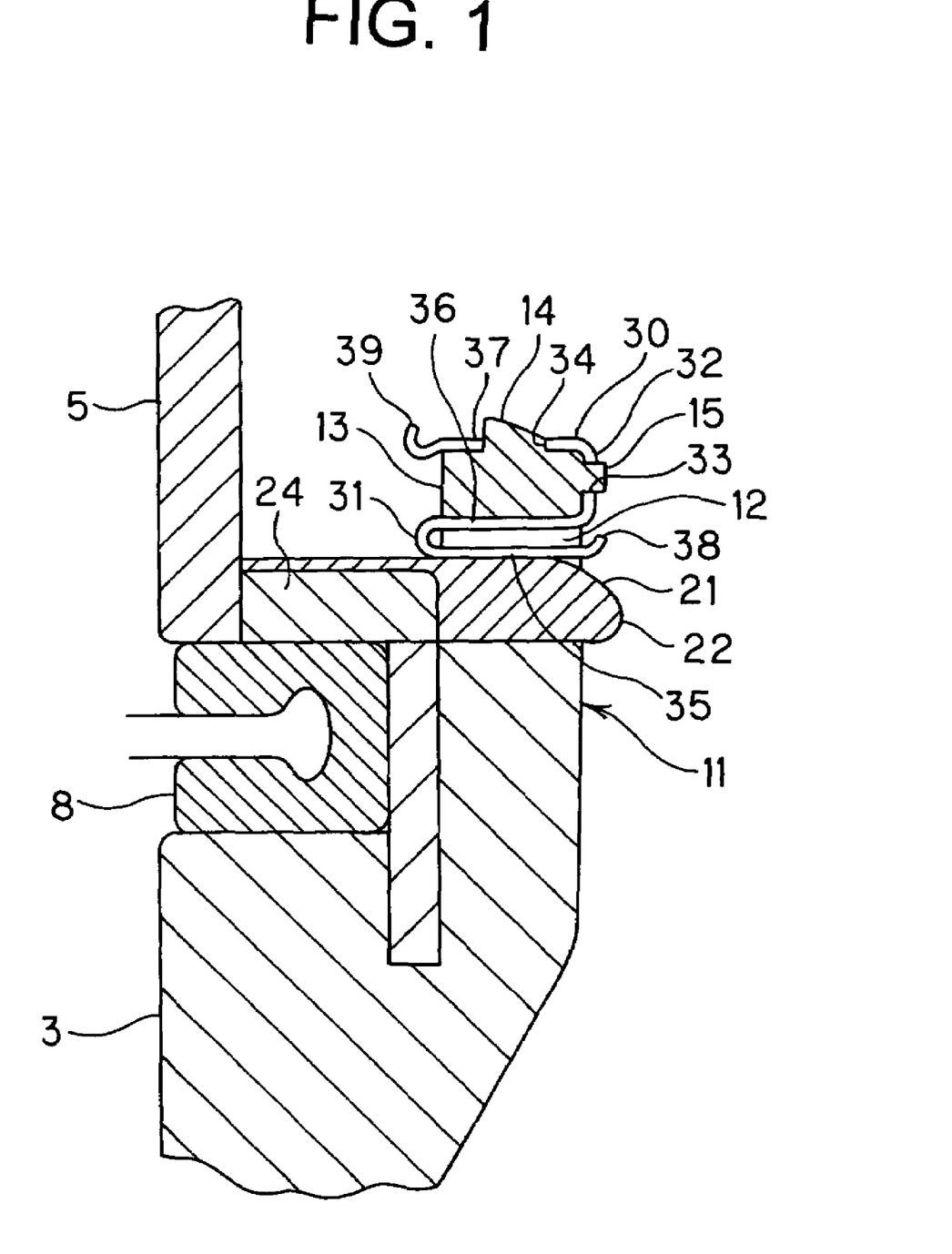
FIG. 1 is a sectional view of a hinge mechanism for air cleaner in accordance with an embodiment of the present invention.
Figure 2:
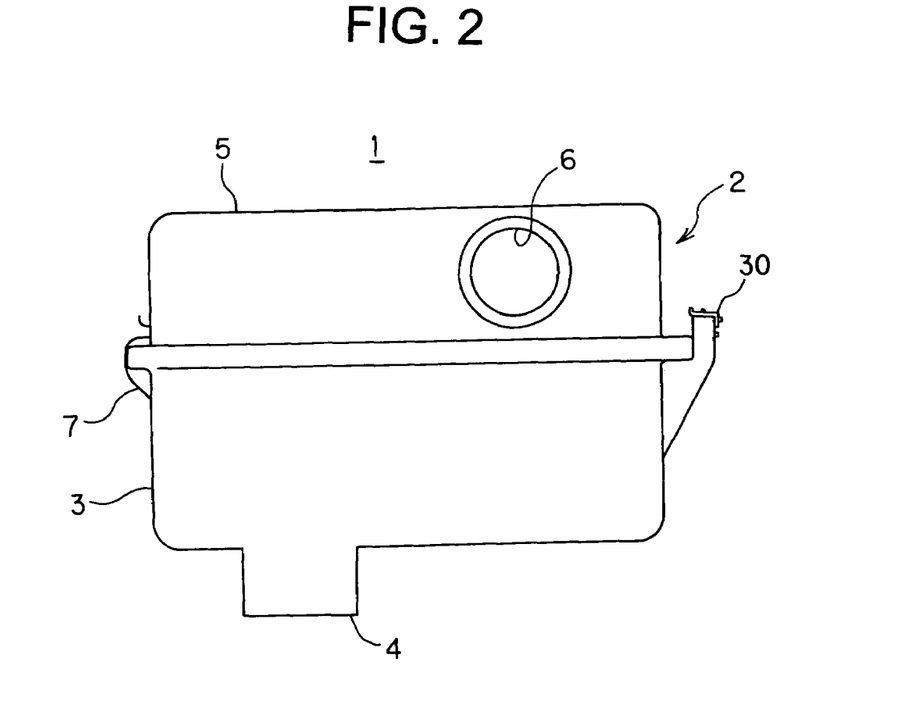
FIG. 2 is a side view of an air cleaner in accordance with an embodiment of the present invention.

FIG. 1 is a sectional view of a hinge mechanism of an air cleaner 1 in accordance with a first embodiment of the present invention. FIG. 2 is a side view of the air cleaner 1 with this hinge mechanism.

First, the air cleaner 1 will be described. The air cleaner 1 has a housing 2 as an outer shell and a filter element (not shown) contained in the housing 2.

The housing 2 is made up of a casing 3 opened at its upper part and a cover 5 which covers the opened upper part of the casing 3. An inlet 4 for introducing air into the air cleaner 1 is provided on the bottom face of the casing 3, while an outlet 6 for emitting filtered air is provided at the side face of the cover 5.

The housing 2 has a hinge mechanism which makes detachably engage the casing 3 and the cover 5 with each other on one side thereof, while it has a fastener 7 which seals the casing 3 and the cover 5 on the side opposite to the side on which the hinge mechanism is provided. The hinge mechanism is located on the side portion so as to form a set at both sides of the housing 2. The fastener 7 is also located at each of both sides of the housing 2. In the housing 2, the cover 5 is engaged with the casing 3 at the region of the hinge mechanism and the opened part of the cover 5 is bonded to that of the casing 3 so that the cover 5 and the casing 3 are pressed against each other having the hinge mechanism like a fulcrum. Then, the cover 5 and the casing 3 are sealed by being clamped with the fastener 7. At this time, a packing 8 provided on the edge of the casing 3, the edge of the cover 5 and the periphery of the filter is inserted (vide FIG. 2).

As shown in FIG. 1, the hinge mechanism has a holding portion 11 on the edge of the casing 3 which extends from the outer side face of the casing 3 toward the upper cover 5 and an inserting part 21 on the edges of the cover 5 which protrudes toward the outer side of the cover 5. Furthermore, the hinge mechanism includes a clip 30 which presses the casing 3 and the cover 5 so as to contact against each other.

Figure 3:
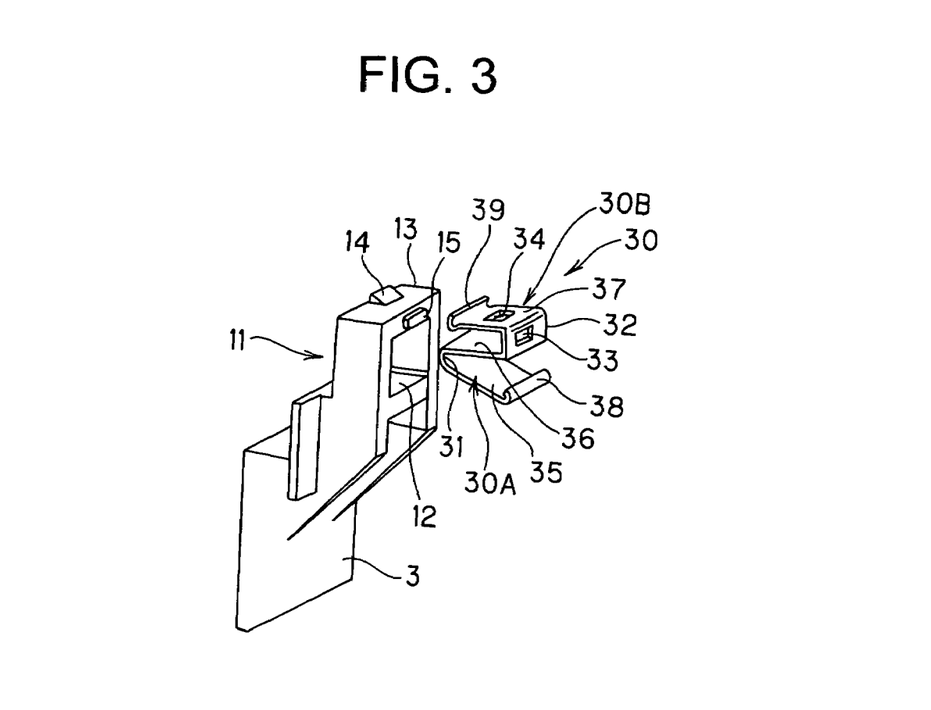
FIG. 3 is a perspective view of a holding portion and a clip engaged with the holding portion.
Figure 4:
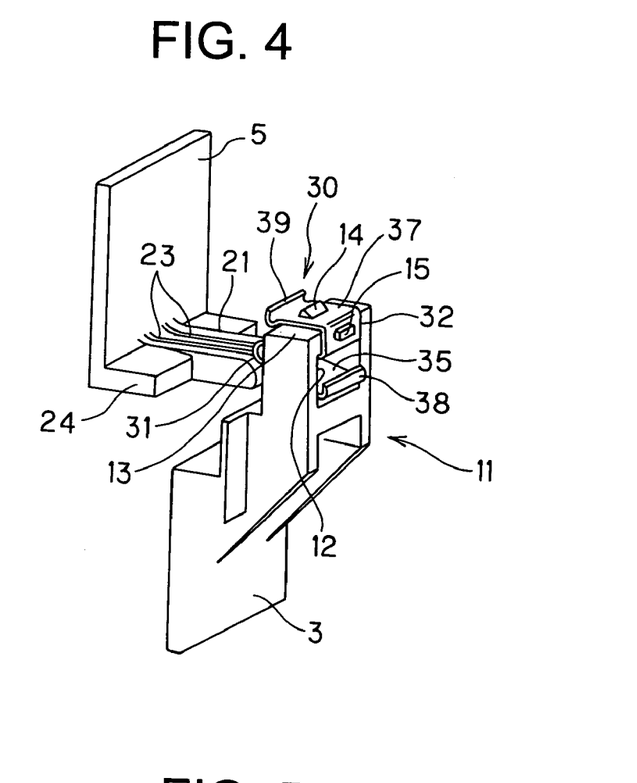
FIG. 4 is a perspective view of the hinge mechanism for air cleaner in the state where an insertion portion is inserted into the holding portion which is engaged with the clip.
Figure 5:
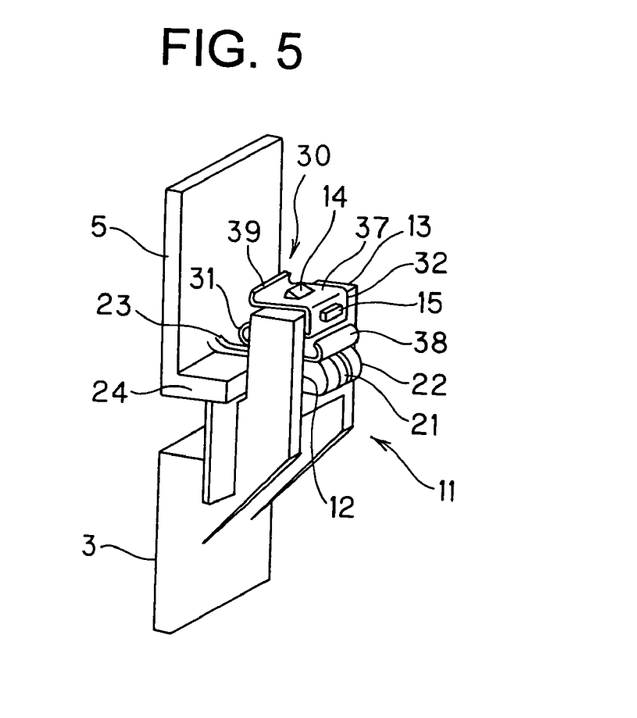
FIG. 5 is a perspective view of hinge mechanism for air cleaner in the state where the holding portion is engaged with the insertion portion.

Details of the hinge mechanism will be described with reference to FIGS. 3 to 5. FIGS. 3 to 5 schematically show only the hinge mechanism of the air cleaner 1.

An insertion hole 12 is formed on the holding portion 11 provided at the casing3 so as to pass there through in the thickness direction. The insertion hole 12 is formed at a predetermined distance from the upper end of the holding portion 11 in the downward direction and formed like a rectangular in outer shape. The region above the insertion hole 12 is a clip attachment part 13 engaged with the clip 30.

The clip attachment part 13 includes engagement claws 14 and 15 at its upper end face and its outer side face, respectively. The engagement claw 14 formed at the upper end face upward protrudes from the upper end face and is formed as an inclined plane so as to be gradually higher in height as it gets closer to the housing 2 from the outer side of the holding portion 11. The side of the housing 2 a vertical surface. On the other hand, the engagement claw 15 formed at the outer side face protrudes outwards from the outer side face and is formed to be substantially rectangular in cross-section and substantially uniform in height.

On the other hand, an insertion portion 21 provided at the cover 5 is formed to have constant width and thickness from its bottom to its front end. A positioning part 24 which protrudes from the outer face of the cover 5, formed integrally with the insertion portion 21, is formed at the bottom of the insertion portion 21. The positioning part 24 contacts with the inner face of the holding portion 11 at its front end to position the cover 5 in the forward or rearward direction with respect to the casing 3. The front end 22 of the insertion portion 21 is stream-lined in appearance for facilitating assembly. Grooves 23 are formed on the surface of the insertion portion 21 in the protruding direction of the insertion portion 21.

The clip 30 is formed like a shape of a character "Z" by bending a plate-like elastic member at two bending parts 31 and 32 reversely in the longitudinal direction. Of these two bending parts 31 and 32, the first bending part 31 is bent to be shaped like an arc, while the second bending part 32 is bent at a right angle at two positions located at a predetermined distance from each other to be rectangular in its side view.

The first bending part 31 and opposing flat plates 35 and 36 located at both sides of the first bending part 31 form a spring part 30A. The second bending part 32 and opposing flat plates 36 and 37 located at both sides of the second bending part 32 form an engagement part 30B for attaching the clip 30 on the hinge mechanism. The flat plate 36 forming the upper portion of the spring part 30A and the flat plate 36 forming the lower portion of the engagement part 30B are located at the same position.

In the spring part 30A, the opposing upper flat plate 36 and lower flat plate 35 are urged in a direction of mutually aparting with respect to the first bending part 31 as a base point. As described later, this urging force is used as pressing force which presses the cover 5 against the casing 3. A front end 38 of the lower flat plate 35 is upward deflected.

In the engagement part 30B, engagement holes 33 and 34 are respectively formed on the second bending part 32 and the upper flat plate 37, in the center of the clip 30 in the width direction. A front end 39 of the flat plate 37 is first downward bent and then upward deflected. When the clip 30 is fitted to the clip attachment part 13 of the holding portion 11, the engagement hole 33 formed on the second bending part 32 is engaged with the engagement claw 15 which is formed on the outer side face of the clip attachment part 13, while the engagement hole 34 formed on the flat plate 37 is engaged with the engagement claw 14 which is formed on the upper face of the clip attachment part 13.

The above-mentioned hinge mechanism is assembled as follows and the cover 5 and the casing 3 are pressed against each other.

First, as shown in FIG. 3, the clip 30 is attached to the clip attachment part 13 of the holding portion 11. That is, the spring part 30A is downward directed with respect to the engagement part 30B and the engagement part 30B is engaged with the clip attachment part 13 from the outer side of the holding portion 11. At this time, since the front end 39 of the upper flat plate 37 forming the engagement part 30B is upward deflected, the front end 39 slides smoothly without being caught by the clip attachment part 13. Since the engagement claw 14 is formed as an inclined plane so as to be gradually higher toward the housing 2. In addition thereto, the clip 30 itself is made of an elastic material, the flat plates 36 and 37 are extended and the second bending part 32 acts as a base point to thereby facilite engagement of the engagement part 30B with the clip attachment part 13. When the clip 30 is fitted, as shown in FIG. 4, the spring part 30A is located inside the insertion hole 12 which is formed on the holding portion 11. The engagement claw 14 which is formed at the upper end face of the clip attachment part 13 is engaged with the engagement hole 34 which is formed on the upper flat plate 37 forming the engagement part 30B, and the engagement claw 15 which is formed at the outer side face is engaged with the engagement hole 33 which is formed on the second bending part 32. The front end 39 of the flat plate 37 is engaged with the edge of the clip attachment part 13.

As described above, since the clip 30 is engaged at the positions on the upper end face and the outer side face of the clip attachment part 13 by the engagement claws 14 and 15, and the front end 39 of the flat plate 37 is engaged with the edge of the clip attachment part 13, the clip 30 is surely held by the clip attachment part 13 in vertical, horizontal and longitudinal directions.

After the clip 30 is fitted to the holding portion 11, as shown in FIG. 5, the insertion portion 21 of the cover 5 is inserted into the insertion hole 12 of the holding portion 11 provided in the casing 3. The insertion portion 21 is inserted into the gap formed between the spring part 30A of the clip 30 and the region at the bottom of the holding portion 11 in the insertion hole 12. At this time, although the spring part 30A of the clip 30 interferes with the insertion portion 21, the first bending part 31 bent in the shape of an arc firstly comes in contact with the insertion portion 21, so that the insertion portion 21 is inserted smoothly.

When the insertion portion 21 is inserted between the spring part 30A and the bottom of the holding portion 11, the spring part 30A is vertically compressed and the upper flat plate 36 and lower flat plate 35 are urged in a direction of mutually aparting from each other with the first bending part 31 acting as a base point. Thus, in the insertion hole 12, the insertion portion 21 is pressed toward the bottom of the holding portion 11. That is, the cover 5 is pressed toward the casing 3. As a result, as shown in FIG. 1, the cover 5 and the casing 3 are pressed against each other through the packing 8 by this pressing force.

In the above-mentioned hinge mechanism for air cleaner, merely by sliding the cover 5 to the casing 3, both can be combined. For this reason, even when the air cleaner is disposed in the area without sufficient space in the engine room, the cover 5 can be readily attached to the casing 3.

Next, a hinge mechanism in accordance with a second embodiment will be described with reference to FIG. 6 to FIG. 9.

Figure 6:
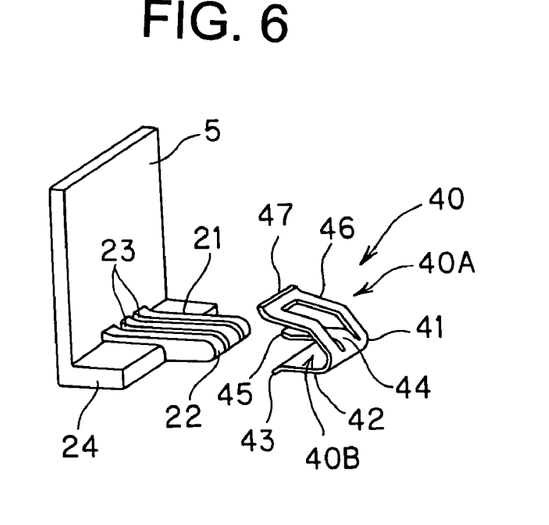
FIG. 6 is a perspective view of an insertion portion and a clip which constitute a hinge mechanism in accordance with another embodiment.

In this hinge mechanism, a clip 40 is fitted to the insertion portion 21 formed at the cover 5.

As shown in FIG. 6, the clip 40 is made of a board-like elastic material and formed so as to be folded in half at a bending part 41 provided substantially at the center of the longitudinal direction. In the clip 40, with reference to the bending part 41, a lower portion 42 is formed like a flat plate and an upper portion includes two regions of a peripheral part 46 and an inside part 44.

In the upper portion, the inside part 44 is separated from the peripheral part 46 by an U-shaped slit so as to connect to each other with the bending part 41. The separated inside part 44 is folded deeper than the peripheral part 46. In the clip 40, the lower flat plate 42 and the deeply folded inside part 44 form an engagement part 40B, while the lower flat plate 42 and the peripheral part 46 form a spring part 40A.

The clip 40 is bent so that a front end 43 of the lower flat plate 42 is downward curled. On the other hand, the clip 40 is bent so that a front end 45 of the inside part 44 and a front end 47 of the peripheral part 46 are upward curled.

The clip 40 is attached to the hinge mechanism and operated as follows.

Figure 7:
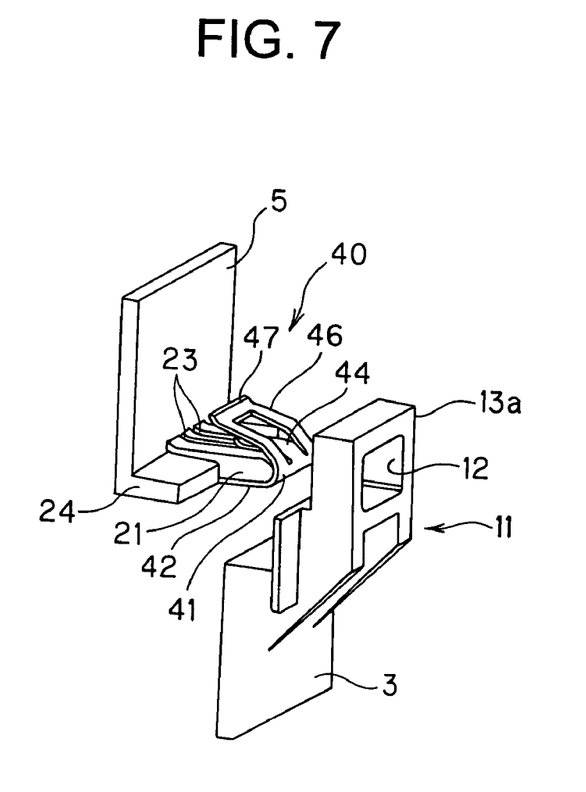
FIG. 7 is a perspective view showing the state where the insertion portion engaged with the clip is inserted into an insertion hole of the holding portion.

As shown in FIG. 7, the front ends 43, 45 and 47 of the flat plate 42, the inside part 44 and the peripheral part 46 is fitted from the front end 22 to the bottom of the insertion portion 21 so that the peripheral part 46 forming the spring part 40A is positioned above the insertion portion 21. Since the front end of the insertion portion 21 is stream-lined in appearance and the front end 43 of the flat plate 42 and the front end 45 of the inside part 44 forming the engagement part 40B are bent together, the insertion portion 21 can be smoothly inserted into the engagement part 40B of the clip 40. Since the grooves 23 are formed on the surface of the insertion portion 21 in the extending direction of the insertion portion 21, the engagement part 40B fitted to the insertion portion 21 is prevented from moving by the grooves in the width direction of the insertion portion 21.

Figure 8:
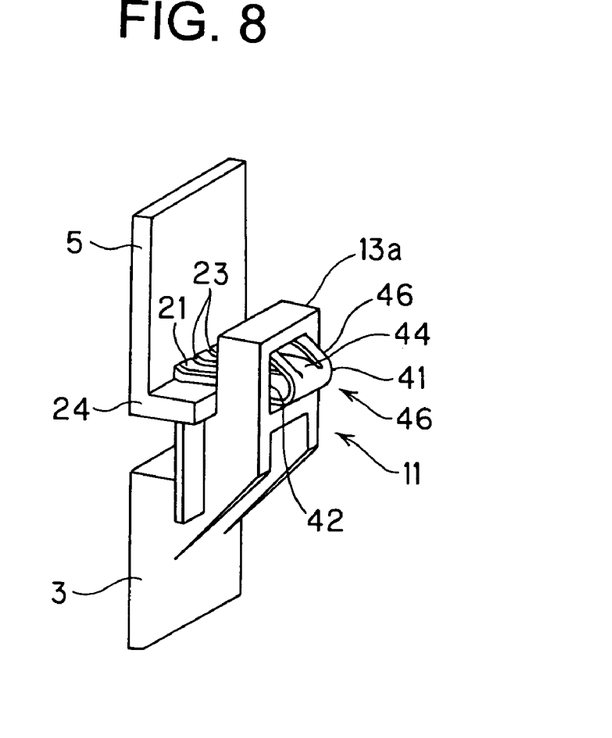
FIG. 8 is a view showing the state where the holding portion is engaged with the insertion portion as viewed from an outside.

As shown in FIG. 8, the insertion portion 21 is inserted into the insertion hole 12 of the holding portion 11 in the state where the clip 40 is fitted to the outer face of the insertion portion 21. At this time, although the peripheral part 46 interferes with a front end part 13a above the insertion hole 12 in the holding portion 11, the peripheral part 46 is elastically deformed and downward pressed, to thereby be smoothly inserted in the insertion hole 12.

When the insertion portion 21 is inserted into the insertion hole 12, the peripheral part 46 forming the spring part 40A gives urging force upwards with the bending part 41 as a base point. For this reason, the insertion portion 21 is pressed toward the bottom of the holding portion 11. Thus, the cover 5 is pressed against the casing 3.

Figure 9:
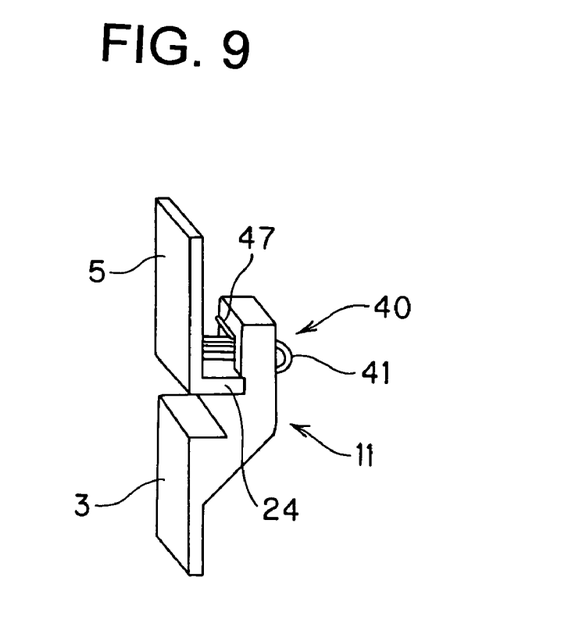
FIG. 9 is a view showing the state where the holding portion is engaged with the insertion portion as viewed from an inside.

When the insertion portion 21 is inserted into the insertion hole 12, as shown in FIG. 9, the front end 43 of the bent flat plate 42 and the front end 47 of the peripheral part 46 contact against the inner face of the holding portion 11. That is, these parts 43 and 47 also function as stoppers for preventing the clip 40 from slipping off. Thus, even when an external force such as oscillation is applied to the clip 40 and thus the clip 40 is about to move toward the front of the insertion portion 21, the front end 43 of the flat plate 42 and the front end 47 of the peripheral part 46 can stably prevent the clip 40 from slipping off.

In the hinge mechanism for air cleaner in accordance with the second embodiment, merely by sliding the cover 5 to the casing 3, both can be combined. Therefore, even when the air cleaner is disposed in the area without sufficient space in the engine room, the cover 5 can be readily attached to the casing 3.

FIG. 10 to FIG. 16 show a third embodiment.

A hinge mechanism in accordance with the third embodiment comprises an insertion portion provided at the cover (vide FIG. 10), a holding portion provided at the casing (vide FIGS. 11 and 12) and a clip fitted to the holding portion (videFIG. 13) The insertion portion 51 provided at the cover 5 is formed so that the width is constant from its bottom to its front end and the thickness is gradually decreased toward its front end. For facilitating assembly, a front end 52 of the insertion portion 51 is stream-lined in appearance. Two grooves 53 are formed along the direction of extending the insertion portion on the top face of the insertion portion 51 in parallel.

Figure 10:
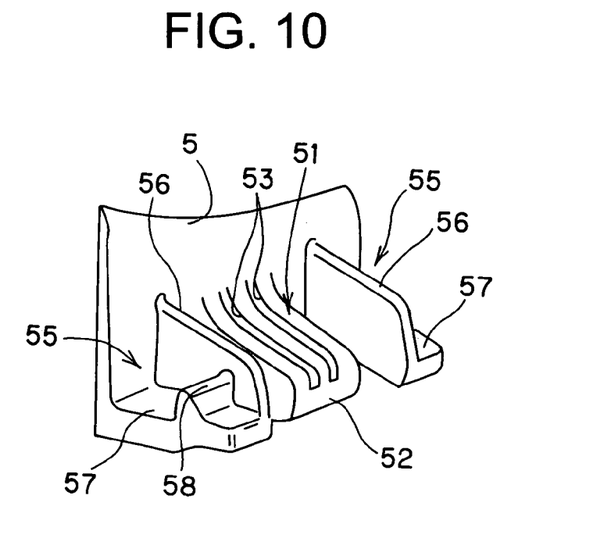
FIG. 10 is a perspective view of an insertion portion which constitutes a hinge mechanism in accordance with a third embodiment of the present invention.

Pressing parts 55 extending from the outer face of the cover 5 in parallel are formed at both sides of the insertion portion 51. The pressing part 55 is formed integral with a vertical plate 56 which is vertically disposed maintaining a certain distance from the side face of the insertion portion 51, a horizontal plate 57 which is horizontally disposed at the outer side of the vertical plate 56 and a rib 58 which protrudes upwards from the top face of the horizontal plate 57. The function of the pressing part 55 will be described in detail later.

Figure 11:
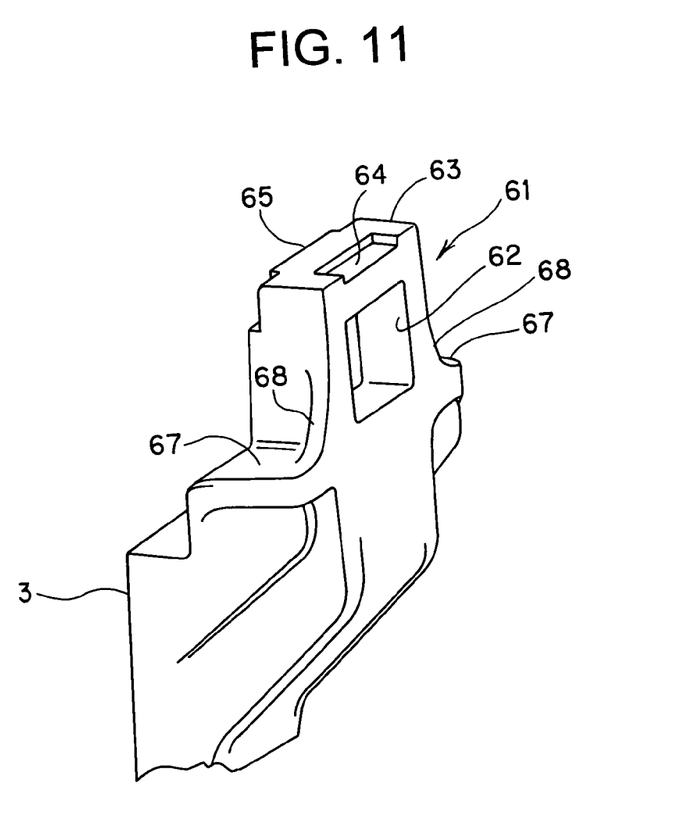
FIG. 11 is a perspective view of a holding portion including the insertion portion which constitutes the hinge mechanism in accordance with the third embodiment.

An insertion hole 62 which passes through the holding portion 61 in the thickness direction is formed at the holding portion 61 of the casing 3. The insertion hole 62 is positioned interposing a predetermined distance from the upper end of the holding portion 61 so as to be rectangular in its appearance. The region above the insertion hole 62 is a clip attachment part 63 to be fitted to a clip 70.

An engagement concave part 64 is formed on the upper end face of the clip attachment part 63, while an engagement protrusion 65 is formed on the inner face of the clip attachment part 63. The engagement protrusion 64 is formed so that its both side edges are located inside the side edges of the clip attachment part 63 and vertically cuts corner parts at which the upper end face intersects the outer side faces. The engagement protrusion 65 is formed so that its both side edges are located inside the side edges of the clip attachment part 63 and is protruded from the clip attachment part 63 in the shape of a rectangle.

Figure 12:
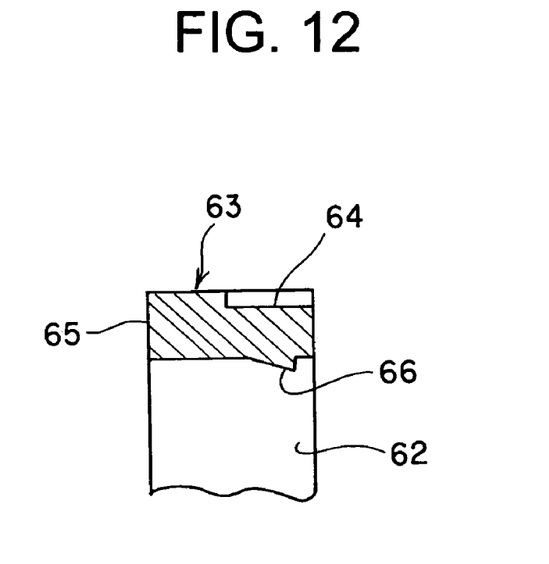
FIG. 12 is a partial sectional view of the holding portion shown in FIG. 11.

As shown in FIG. 12, an engagement claw 66 is formed on the bottom face of the clip attachment part 63 in the insertion hole 62. The engagement claw 66 is formed like an inclined plane so as to be gradually higher in its height as it gets closer to the outer face from the inner face.

A contact face 67 which extends horizontally to project outwards is located at each of both sides of the holding portion 61. The contact face 67 is pressed by the pressing part 55 of the cover 3 from above when the cover 5 is engaged with the casing 3 with the hinge mechanism. A stopper 68 is formed on the top face of the contact face 67 at the side of the outer side face of the holding portion 61 so as to connect to the holding portion 61. The stopper 68 serves to stop insertion of the insertion portion 51 into the insertion hole 62 at an appropriate position.

Figure 13:
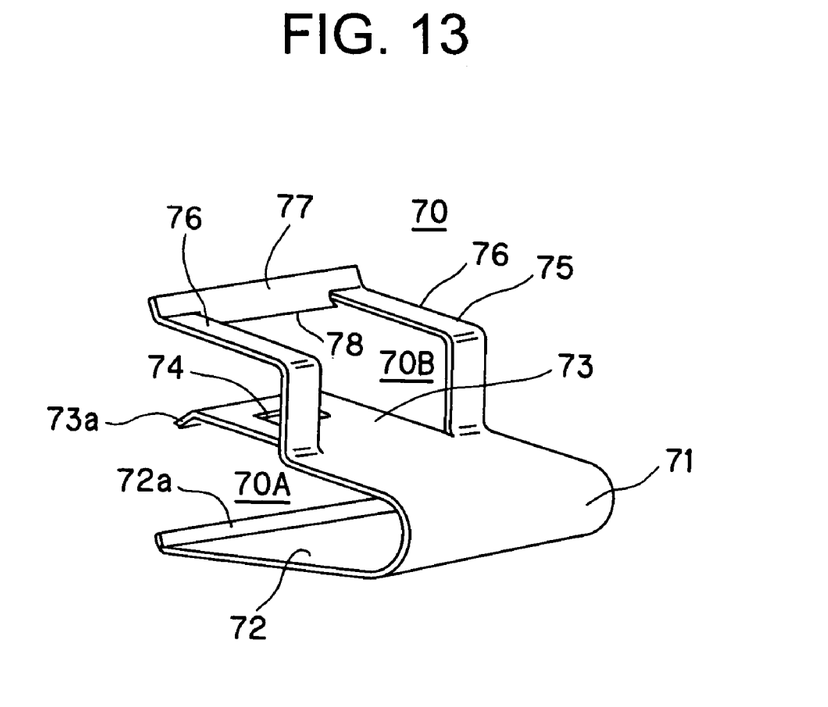
FIG. 13 is a perspective view of a clip which constitutes the hinge mechanism in accordance with the third embodiment.

The clip 70 is made of a plate-like elastic member so as to be bent in half at a bending part 71, located substantially in the center of the clip 70 in the longitudinal direction, as shown in FIG. 13. In the clip 70, with reference to the bending part 71, a lower portion is formed like a flat plate and an upper portion is separated into two regions of an inside part 73 and a peripheral part 75 surrounding the periphery of the inside part 73.

In the upper portion, the inside part 73 is separated from the peripheral part 75 by an U-shaped slit to connect to each other on a side of the bending part 71 side. The separated inside part 73 extends straightly from the bending part 71. The peripheral part 75 includes side edge parts 76 and a front end part 77 and is located on the outer side of the inside part 73 with reference to the bending part 71 by bending the side edge parts 76. The side end parts 76 of the peripheral part 75 each are bent outwards perpendicular to the inside part 73 at the bottom that is connected to the inside part 73 and bent at right angles in the same direction as the bending direction of the bending part 71. Thus, the side edge parts 76 of the peripheral part 75 are substantially parallel to the inside part 73.

An engagement hole 74 penetrating the inside part 73 is formed at an position a little closer to the bending part 71 from the front end on the inside part 73. A front end 73a of the inside part 73 is downward curved so as to face to the flat end 72.

Contrary to the inside part 73, a front end 77 of the peripheral part 75 is curved with respect to the side edge parts 76 so as to face upward. Cuts are made at bases of the front end part 77 relative to the side edge parts 76 and the region between the cuts protrudes toward the inside part 73. The protruded region is an engagement claw 78. The engagement claw is engaged with the engagement concave part 64 formed at the clip attachment part 63 when the clip 70 is attached to the clip attachment part 63.

As opposed to the above-mentioned upper portion, a front end 72a of the flat plate 72 located below the bending part 71 is upward curved so as to be opposed to the front end 73a of the inside part 73.

In the clip 70 thus formed, the lower flat plate 72 and inside part 73 constitute the spring part 70A, while the outer part 73 and the peripheral part 75 constitute the engagement part 70B.

Figure 14:
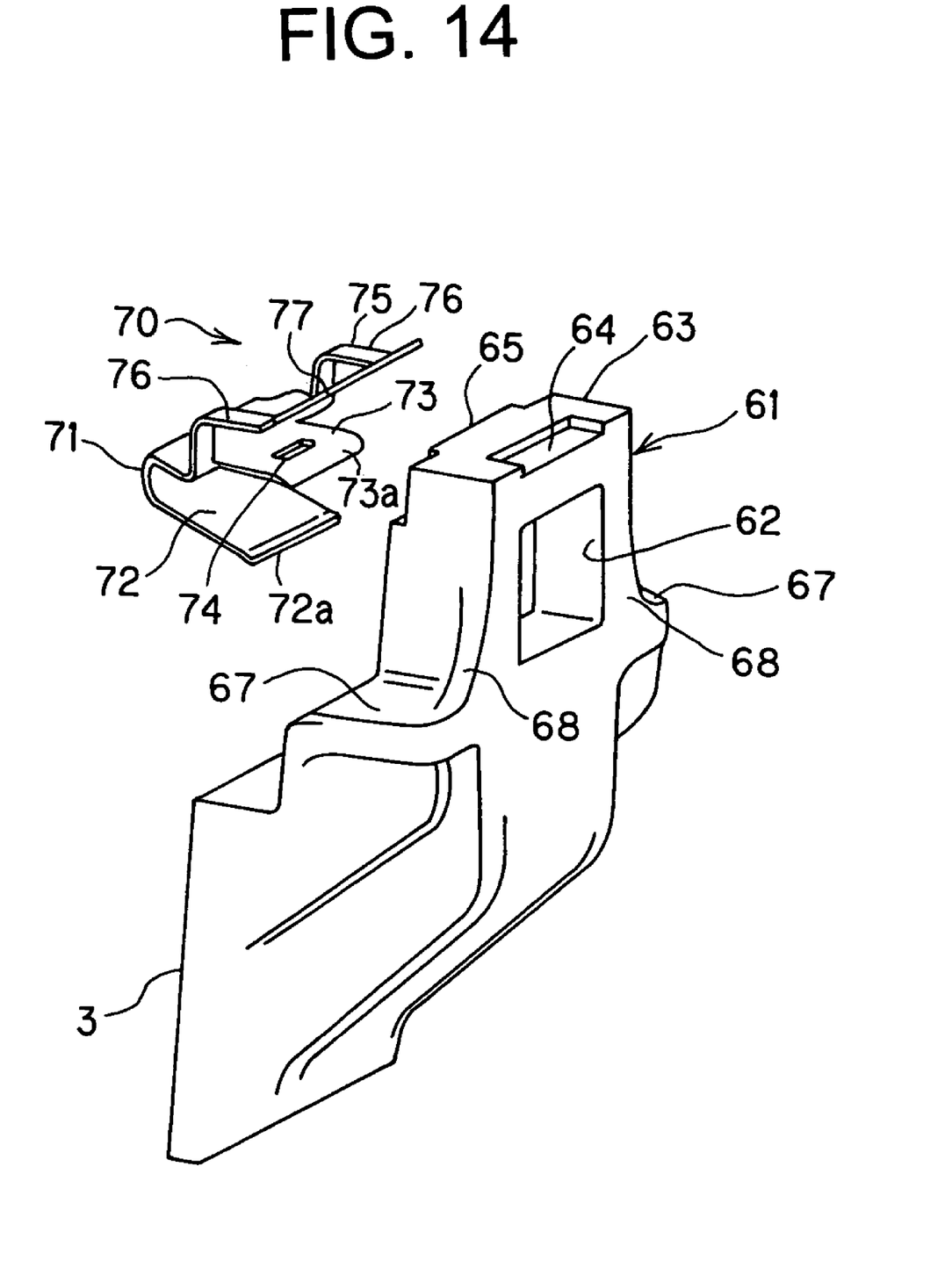
FIG. 14 is a perspective view of the clip and the holding portion in the state where the clip is fitted to the holding portion.
Figure 15:
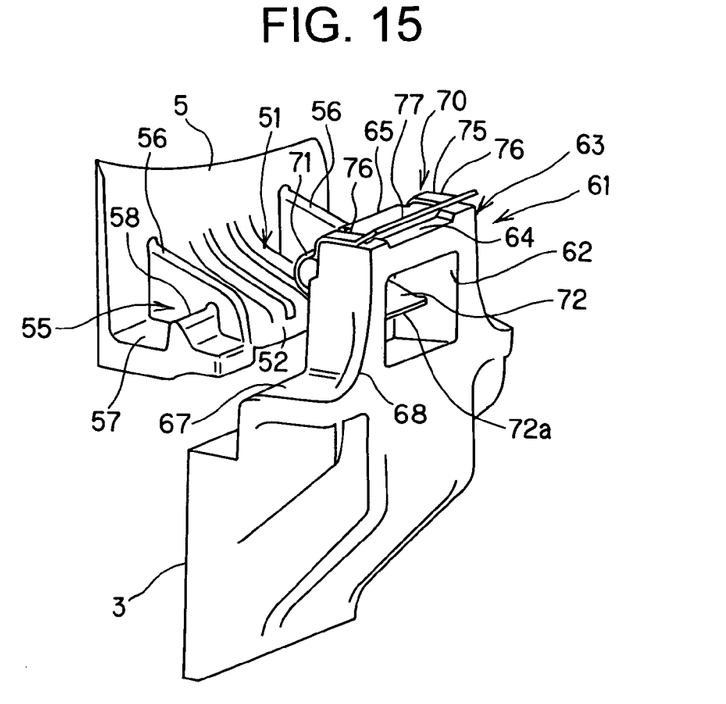
FIG. 15 is a perspective view of the hinge mechanism in the state where the holding portion fitted to the clip is engaged with the insertion portion.
Figure 16:
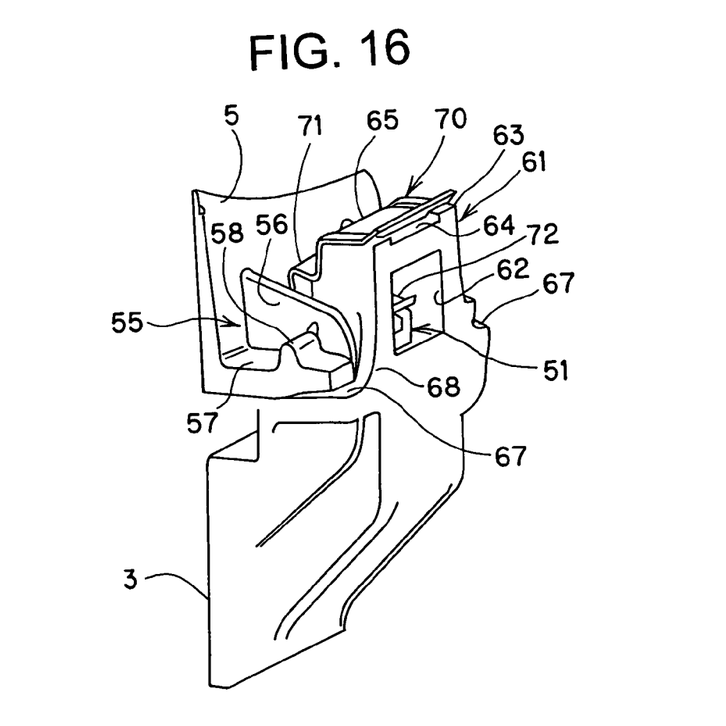
FIG. 16 is a perspective view of the hinge mechanism in the state where the holding portion is engaged with the insertion portion.

FIGS. 14 to 16 show the aspect of the invention where the clip 70 is attached to the clip attachment part of the holding portion 71 which is formed in the casing 3 and the state where the insertion portion 51 and the holding portion 61 which constitute the hinge mechanism are engaged with each other.

The front ends 72a, 73a and 77 respectively of the flat plate 72, inside part 73 and the peripheral part 75 of the clip 70 are oriented to the clip attachment part 63 so that the clip 70 is fitted to the clip attachment part 63 from the inner face side of the holding portion 61. At this time, the flat plate 72 which functions as the spring part 70A is downward directed to be located on the inner side of the insertion hole 62 of the holding portion 61. Then, the clip attachment part 63 is inserted between the peripheral part 75 and the inside part 73 which constitute the engagement part 70B. Since both of the front end 73a of the inside part 73 and the front end 77 of the peripheral part 75 are deflected, the clip 70 can be smoothly fitted to the clip attachment part 63 without interference of the front ends 73a and 77 with the clip attachment part 63.

When the clip 70 is fitted to the clip attachment part 63, the engagement claw 78 of the clip 70 is engaged with the engagement concave part 64 of the clip attachment part 63 and the engagement convex part 65 formed at the clip attachment part is inserted between the side edge parts 76 of the peripheral part 75. Although not shown in FIG. 14 to FIG. 16, the engagement claw 66 formed on the bottom face of the clip attachment part 63 is engaged with the engagement hole 74 formed on the inside part of the clip 70. Thus, even when the external force is applied to the clip 70, the clip 70 can be effectively prevented from slipping off from the clip attachment part 63.

After the clip 70 is fitted to the clip attachment part 63, the insertion portion 51 is inserted into the insertion hole 62 of the holding portion 61. The insertion portion 51 is inserted between the flat plate 72 and the bottom of the holding portion 61 in the insertion hole 62. At this time, since the front end 72a of the flat plate 72 is upward deflected and the front end of the insertion portion 51 is stream-lined in its appearance, the insertion portion 51 is smoothly inserted into the insertion hole 62. The insertion portion 51 is inserted into the insertion hole 62 and the bottom faces of the pressing parts 55 formed on both sides of the insertion portion 51 slide on the contact faces 67 formed on both sides of the holding portion 61. During the operation, since the vertical plates 56 slide along the side faces of the holding portion 61, the vertical plates 56 function as guides. The insertion portion 51 is inserted until the front ends of the horizontal plate 57 which forms the pressing parts 55 formed on both sides of the insertion portion 51 come into contact with stoppers 68 formed on both sides of the holding portion.

When the insertion portion 51 is inserted into the insertion hole 62, the flat plate 72 is engaged with the groove 53 formed on the top face of the insertion portion 51, to thereby effectively prevent displacement of the insertion portion 51 in the horizontal direction.

Since the insertion portion 51 is formed so as to be gradually greater in thickness as it gets closer to the bottom from the front end, when the insertion portion 51 is further inserted into the insertion hole 62, the insertion portion 51 pushes the flat plate 72 upwards with a strong force. The flat plate 72 presses the insertion portion 51 toward the bottom of the holding portion 61 with a counter force. This force urges the cover 5 to contact against the casing 3.

When the insertion portion 51 is pressed against the bottom of the holding portion 61 with an excessive force by the spring part 70A of the clip 70, the packing (not shown) sandwiched between the cover 5 and the casing 3 may be damaged. In this hinge mechanism, since the pressing parts 55 are formed at the cover 5 and the contact faces 67 are formed at the casing 3, even when the insertion portion 51 is pressed with an excessive force, the pressing parts 55 press the contact faces 67, to thereby prevent the cover 5 from being unnecessarily pressed against the case. Thus, any damage to the packing can be prevented.

In the hinge mechanism for air cleaner in accordance with the third embodiment, by sliding the cover 5 to the casing 3, both can be combined. Thus, even when the air cleaner is disposed in the area without sufficient space in the engine room, the cover 5 can be readily attached to the casing 3.

Although the case where the casing is provided with the holding portion and the cover is provided with the insertion portion is described in these embodiments, the present invention is not limited to this and the casing may include the insertion portion and the cover may include the holding portion. In this case, the holding portion may be located at one side of the cover to protrude toward the case, while the insertion portion may be located at one side of the casing to protrude outwards.

Although the clip used for the hinge mechanism of the air cleaner may be a metal plate made of an elastic material, it is not limited to the metal plate and a resin material may be adopted.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2004-288167 filed on Sep. 30, 2004 including the specification, claims, drawings and summary is incorporated herein by reference in its entirety.

What is claimed is:

1. A hinge mechanism for detachably engaging a casing with a cover in an air cleaner comprising:
   an insertion portion which is formed on one of the casing and the cover and protrudes outward from an outer face of the one of the casing and the cover, the insertion portion having an insertion tip; and
   a holding portion which is formed on the other one of the casing and the cover, the holding portion having an insertion hole for receiving the insertion portion thereinto;
   an elastic clip member retained on one of the holding portion and the insertion portion,
   wherein the clip member includes an engagement part which releasably engages the insertion hole of the holding portion or an outer peripheral face of the insertion portion, and a spring part is formed integrally with the engagement part to apply a pressing force,
   the spring part includes a bending part which includes a bend in the clip member, and first and second opposing parts of the clip member project from either side of the bending part,
   the insertion portion is shaped and configured to be removably inserted into the insertion hole;
   wherein the first opposing part is formed into an inside part and an outside peripheral part by a U-shaped slot, the inside part and an outside peripheral part maintaining a connection near the bending part and defining the engagement part;
   a secondary bending part, which biases the outside peripheral part farther from the second opposing part than the inside part is formed in the outside peripheral part.

2. A hinge mechanism according to claim 1, wherein the bending part of the clip member is bent in a direction opposite to the secondary bending part of the clip member,
   wherein the secondary bending part is disposed between the second opposing part and a third opposing part,
   the clip member releasably engaging the holding portion so that the spring part is located inside the insertion hole, and
   the insertion portion is removably inserted between the insertion hole of the holding portion and the spring part.

3. A hinge mechanism according to claim 2, wherein the engagement part of the clip is an engagement hole formed on both the second bending part, and the third opposing part,
   the holding portion has engagement claws that releasably engage with the third opposing part of the clip member, and
   the engagement claws are respectively releasably inserted into the engagement holes so as to position the clip member on the holding portion.

4. A hinge mechanism according to claim 2, wherein an end of the third opposing part of the clip is outwardly deflected.

5. A hinge mechanism according to claim 1, wherein the inside part and the outside peripheral part are bent at the bending part in a same direction,
   the engagement part of the clip member is releasably engaged with an outer face of the insertion portion such that the outside peripheral part is directed toward the insertion hole of the holding portion.

6. A hinge mechanism according to claim 1, wherein the bending part of the clip member is disposed adjacent to the insertion tip of the insertion portion so as to be opposite to the cover or the casing having the holding portion formed therein.

7. A hinge mechanism according to claim 6, wherein the engagement part of the clip member is formed in the outside peripheral part or the inside part.

8. A hinge mechanism according to claim 7, wherein an engagement protrusion is formed on either of the insertion portion or holding portion so as to be inserted into a corresponding space formed in the outside peripheral part of the clip member.

9. A hinge mechanism according to claim 6, wherein the outside peripheral part and the inside part are deflected in directions opposite to each other.

* * * * *